United States Patent [19]
Schiffarth et al.

[11] 3,939,028
[45] Feb. 17, 1976

[54] PROTECTION OF CARBON ARTICLES

[75] Inventors: Josef Schiffarth; Clive Graham Lorkin; Kenneth John Fletcher, all of Borken, Germany

[73] Assignee: Foseco International Limited, Birmingham, England

[22] Filed: Oct. 29, 1974

[21] Appl. No.: 518,897

Related U.S. Application Data

[62] Division of Ser. No. 343,217, March 21, 1973, abandoned.

[30] Foreign Application Priority Data

Mar. 22, 1972 United Kingdom............... 13390/72
July 26, 1972 United Kingdom............... 34986/72

[52] U.S. Cl. .................. 156/306; 13/18; 106/286; 204/290 R; 219/145; 219/146; 313/355; 427/59; 427/113; 427/376; 428/538
[51] Int. Cl.²..................... C09J 5/00; C09J 7/00
[58] Field of Search ........ 13/18; 29/191.6; 75/10 R; 117/228; 156/294, 306, 52, 325, 155; 219/145, 146; 313/354, 355; 204/290 R; 427/59, 376; 428/367, 538, 375; 264/105, 272, 263; 106/286

[56] References Cited
UNITED STATES PATENTS

| | | | |
|---|---|---|---|
| 1,948,382 | 2/1934 | Johnson............................ | 117/228 X |
| 2,229,329 | 1/1941 | Kaspar...................... | 156/82 |
| 2,472,171 | 6/1949 | Oswald............................ | 156/294 X |
| 2,636,836 | 4/1953 | Whigham et al..................... | 156/306 |
| 3,078,186 | 2/1963 | Tierney................................ | 428/538 |
| 3,132,979 | 5/1964 | Bickerdike et al..................... | 156/89 |
| 3,501,289 | 3/1970 | Finkl et al.............................. | 75/12 |

*Primary Examiner*—William A. Powell
*Assistant Examiner*—J. J. Gallagher
*Attorney, Agent, or Firm*—Cushman, Darby & Cushman

[57] ABSTRACT

Carbon articles, particularly carbon electrodes, are protected against corrosive attack in use by fusing material to the article, or applying material to the carbon article which under the conditions of its use is capable of fusing to the carbon article, to form a coherent coating of protective material over only that part of the carbon article liable to corrosive attack when the article is in use.

9 Claims, No Drawings

PROTECTION OF CARBON ARTICLES

This is a division of application Ser. No. 343,217 filed Mar. 21, 1973, now abandoned.

This invention relates to the protection of carbon articles, e.g. graphite crucibles, furnace linings etc. against attack, e.g. against oxidation when subjected to elevated temperatures. In particular the present invention relates to the reduction of oxidation losses of graphite electrodes such as furnace electrodes.

It has been shown that when a graphite electrode is used in the electric melting of steel in arc furnaces substantial electrode losses are encountered due to oxidation of the sides of the electrodes during use. As electrode costs are a very substantial part of the electric arc steelmaking process, such losses are very costly. In severe cases, up to 70% by weight of the electrode may be oxidised from the side of the electrode and not in the arc itself. In view of the above many attempts have been made to protect arc furnace electrodes by protective coating, but until now these have met with very little success. Among attempts which have been made are those of British patent specificaton Nos. 1,026,055, 1,218,662 and German Pat. No. 1,009,093. These specifications describe coatings of one or more layers including aluminium with boron/silicon/titanium alloys or compounds, iron with chromium/aluminum/silicon alloys or compounds, and titanium silicide/silver.

In all these processes, the electrodes are coated prior to being put to service in the furnace or the like. This leads to difficulties, because the electrode clamps, which supply current to the electrodes, cannot make direct electrical contact with the carbonaceous electrode material. Consequently the current has to pass through the applied coating, and since such coatings often have specific resistances higher than those of the clamp and electrode materials, the coating in the region of the clamp becomes locally overheated. This can cause burning of the clamps themselves, and disruption of the coating so that when this part of the electrode is lowered, with respect to the clamp, into the furnace, the degree of protection is considerably reduced. Local overheating can also be caused if the coatings are uneven or have been damaged during the mounting of the electrode in the clamp, or, as may be the case with certain metallic coatings, by reaction or alloying with the clamp. Further, since the coatings suggested so far have normally been refractory and brittle, they do not readily accomodate changes in volume due to temperature fluctuations and tend to crack. Oxidation of the electrode then proceeds through the crack under the coating. Coatings which have failed, either in this way or by other degradation such as melting, evaporation or oxidation, are difficult to repair since the application processes do not lend themselves to repeated coating in situ.

According to the present invention there is provided a method of protecting a carbon article against corrosive attack in use which method comprises fusing material to the carbon article, or applying material to the carbon article which under the conditions of its use is capable of fusing to the carbon article, to form a coherent coating of protective material over only that part of the carbon article liable to corrosive attack when the article is in use.

The present method is of particular utility in the protection of carbon, e.g. graphite electrodes against oxidation. In this case material is fused to or applied to the electrode so as to form a coherent coating of protective material over only that part of the electrode liable to oxidation when the electrode is in use. Generally the material is fused to or applied to the electrode such as to form a coherent coating over substantially all of that part of the electrode not held by clamps when the electrode is in use, i.e. that part within the furnace itself and immediately above, but below the position of the clamps. Thus all or most of the electrode surface below the clamps will at any time be protected, but the clamps themselves will always maintain electrical contact with the electrode surface directly avoiding local overheating. Furthermore, the nature of the protective material and its method of application enable further treatments of the electrode to be made as necessary, for example when the electrode is lowered as consumption takes place at the tip then fresh electrode must be protected, or to strengthen the initial coating to compensate for gradual degradation due to evaporation and/or other losses.

The present invention also provides a process for melting metal using a carbon electrode electric arc furnace which process comprises:

a. fusing material to electrodes of the furnace, or applying to electrodes of the furnace material which under the conditions of step b. is capable of fusing to the electrodes, to form a coherent coating of protective material only over that part of the electrode which is liable to oxidation in step b. and b. melting metal in the furnace by applying electric current to the electrodes.

The invention also provides a carbon electrode carrying a coherent coating of protective material over only that part of the electrode liable to attack when the electrode is in use.

The protective material is generally applied to the carbon articles, e.g. electrodes, in the form of preformed sheet material, e.g. in the form of tubes, tiles or plate comprising two basic components, a matrix preferably having a melting point below 1,000°C and a refractory filler. These sheets are usually 1 to 10 mm thick. Optionally the sheets may also contain fibrous material, which has been found to impart strength and flexibility to the finished article, and in addition may be advantageous for certain manufacturing processes.

The components of the sheet material may be mixed, melted or fused together, optionally with a binder, and formed into the desired shape by casting, pressing, rolling or extruding, for example. Any of these forming processes may be carried out with the application of heat (hot forming) if desired. Alternatively, the components may be mixed with a liquid or plastic medium which may, optionally, act as a binder, to form a paste or liquid which is then formed into shape by a process such as one of those mentioned above, this forming process may be followed by a drying, or curing procedure, if necessary.

A preferred method of forming the sheets is to mix the basic components into a suspension or slurry with a liquid carrier, usually water. This slurry may also advantageously contain fibrous material. The slurry is then dewatered by filtering through a gauze or similar pervious surface, this filtration being preferably aided by a pressure difference which may be established by increasing the pressure above the slurry and/or by reducing the pressure (i.e. evacuation) on the efflux side of the gauze or filter. After the filtration is complete the solids remain as a moist thin cake on the filter. This cake may then be removed for drying and/or further treatment.

This drying process is conveniently carried out by placing the "green" sheets, tiles or tubes on drying trays or racks, which may be flat or shaped. In the case of shaped racks, these may impart to the dried sheet the approximate curved form of the electrodes to which they are to be applied. Alternatively, such shaped sheets or tiles may be produced by forming the green sheets or tiles to a self-supporting shape, e.g. a cylinder or semi-cylinder either by using a dewatering filter of the appropriate curvature or by shaping the green sheets or tiles after dewatering. Sheets, tiles and tubes are hereinafter collectively referred to as tiles.

Tiles made by any of the above processes may optionally incorporate one or more layers of more flexible material such as for example plastics, cardboard, heavy paper, ceramic fibre "paper" or other fibrous sheet material, or thin sheet metal, in order to improve the strength and flexibility characteristics of the finished sheets or tiles. Such additional layers do not necessarily contribute to the protective properties of the complete tiles but, in those cases where the additional layer is present on the outer surface of the tile, and the tile becomes sticky during application, the layer prevents the tile from sticking to the application equipment. The additional layers may be advantageously incorporated during the manufacturing process but may alternatively be applied to the tile, for example by adhesive, after formation of the tile is complete.

After application to the electrode and/or when the electrode is used in the furnace, the matrix fuses, to form a continuous coating sticking to the electrode surface. This molten matrix constitutes a layer of high impermeability, which property is further enhanced by the presence of the filler. Such a coating substantially reduces attack of the electrode by the furnace atmosphere.

A further very important property of the filler is to increase the viscosity of the matrix so that it does not drip off from the electrode, and the filler level is so adjusted that the coating is fluid/plastic over a wide temperature range thus easily accomodating temperature fluctuation without cracking.

It has been found that the matrix to filler weight ratio in the sheets or tiles may vary between 90:10 and 15:85 depending upon the temperature to which the applied sheets are to be subjected. For the purposes of clarification, preferred matrix/filler weight ratios in the present invention are:

For a service temperature of 700°C a matrix/filler weight ratio between 65:35 and 85:15 is preferred.

For a service temperature of 1,600°C a matrix/filler weight ratio between 25:75 and 50:50 is preferred.

The matrix may contain "combined water" which is driven off immediately after application of the sheets or tiles to the electrode. An example of such a matrix is boric acid which, in use, is converted to boric oxide.

Thus a sheet or tile having an original matrix to filler weight ratio of 80 boric acid: 20 filler is converted into a coating having a weight ratio of 70:30 boric oxide/filler.

In many cases it may be advantageous, particularly if the sheets or tiles are prepared from a slurry, to include fibrous material of one or more types to a total amount not normally exceeding 20% by weight.

Because the coating firmly adheres by virtue of the wetting of the electrode surface by the matrix, and because there is no tendency to crack, further sheets or coating may be subsequently applied without risk of the initial layer flaking off.

This adhesion may be enhanced by the application of a coating of the matrix material or of matrix enriched material or of a similar material which acts as an adhesive. Such adhesive coatings may be conveniently applied to the appropriate surface of the sheet during or following the forming process and/or directly to the surface of the electrode.

The sheets may be applied to the hot electrode either above or below the roof of the furnace or adjacent to the furnace and held in position by external means until the protective material has softened sufficiently, by melting of the matrix, to allow the sheet to take up the exact contour of and to adhere to the surface of the electrode.

Should it not be practical in certain furnace constructions to apply the sheets whilst the electrode is in position in its clamp, then the electrode may be removed from its clamp for application of the sheets away from the furnace; if the electrode is removed from its clamp for this purpose the sheets are applied to only that part of the electrode below the clamping level.

Furthermore, if that part of the electrode to which the protective material is to be applied is at a temperature below that of the melting point of the matrix material or other adhesive materials, the sheets may be conveniently held in position by, for example, bands, clips, wire, nails or the like until the electrode attains the temperature, necessary to render the sheet self-adhesive, e.g. by being brought into use in the furnace.

Alternatively, the electrode may be heated by external means before or after application of the sheets thereto, e.g. by flame or infrared heating, or by electrical heating such as induction or microwave heating, so that at least the surface of the electrode attains the temperature necessary to render the sheet self-adhesive.

Typical materials available for the manufacture of the sheets are as follows:- Suitable matrices may be chosen from graphite-wetting materials for example
1. boron-containing compounds such as boric oxide, boric acid, metaboric acid, salts of these acids e.g. sodium borate;
2. vanadium pentoxide;
3. combinations of glaze-forming materials e.g. phosphates, fluorides or silicates such as alkali metal phosphates, aluminium orthophosphate, alkali metal silicates, glass, calcium fluoride, sodium aluminium fluoride or sodium borofluoride.

It is possible to produce satisfactory products by combining into a composition one or more materials from group 3 with one or more of the materials of group 1 and/or 2 or it may be desirable to use one or more of any of the materials included in group 1 - 3 in conjunction with a surface tension modifying agent such as chrome ore.

Suitable fillers may be, for example refractory oxides, carbides, nitrides or borides such as chromic oxide, magnesium oxide, zirconium oxide, titanium oxide, silicon carbide, wolfram carbide, boron nitride, silicon nitride, titanium boride, zirconium boride and zirconium carbide. The refractory filler material generally comprises 80% of particles having a particle size of less than 0.5 mm, preferably 80% particles less than 0.2 mm in size and more preferably 80% particles less than 0.06 mm in size.

Suitable fibrous materials include asbestos, aluminium silicate fibre, glass fibre, aluminium chromium silicate fibre, calcium silicate fibre, mineral wool, slag wool, paper including waste paper, paper pulp and newsprint, and textile fibres such as rayon, cotton and the like.

Especially effective protective coating compositions are those comprising matrices based on boron compounds with refractory carbide fillers. In particular coatings comprising a matrix of boric oxide or boric acid with a silicon carbide filler have proved especially effective, initial trials having shown reductions in electrode consumption of up to 52%.

The following Examples further illustrate the present invention.

EXAMPLE 1

To a hot electrode (1,200°C) measuring 230 mm diameter for use in a 10 ton capacity furnace there were applied sheets measuring 25 cm square comprising 65% silicon carbide, 29% boric acid ($H_3BO_3$) (80:20 silicon carbide to boric oxide weight ratio after application), 4% amosite asbestos and 2% chopped (1 cm) rayon fibres. Each sheet was coated, after forming and drying, with boric acid at a rate of 4 g per sq. dm. On fusing onto the surface of the electrode a coating approximately 2 mm thick was produced.

After 2 charges (approximately nine hours) in comparison to the uncoated part of the electrode it was found that electrode consumption had been reduced by 52%.

EXAMPLE 2

To a hot electrode (1,050°C) measuring 560 mm diameter for use in a 70 ton capacity furnace there were applied sheets measuring 25 cm square comprising 54% silicon carbide, 40% boric acid ($H_3BO_3$) (70:30 silicon carbide to boric oxide weight ratio after application), 4% amosite asbestos and 2% chopped (1 cm) rayon fibres. Each sheet was coated, after forming and drying, with boric acid at a rate of 4 g per sq. dm. On fusing onto the surface of the electrode a coating approximately 2 mm thick was produced.

After 4 charges (approximately 17 hours) in comparison to the uncoated part of the electrode it was found that electrode consumption had been reduced by 48%.

We claim:

1. A method of protecting the sides of an arc furnace electrode against corrosive attack which comprises applying to the sides of the electrode preformed sheets of material which, on heating, will fuse to form a coherent coating of protective material on the surface of the electrode and thereafter heating the sides of the electrode to a temperature sufficient to fuse the preformed sheet material thereon.

2. A method according to claim 1 wherein the heating step is effected by placing the electrode in service in an electric arc furnace.

3. A method according to claim 1 wherein the preformed sheet material comprises a bonded composition consisting essentially of glaze-forming components constituting a matrix having a melting point of less than 1,000°C and a refractory filler.

4. A method of protecting the sides of an arc furnace carbon electrode against corrosive attack when subjected to elevated temperatures during use comprising applying to the sides of the electrode at least one preformed self-supporting sheet of a material which comprises an inorganic fusible matrix of graphite-wetting material and particles of a refractory filler and thereafter heating the sides of the electrode to a temperature sufficient to fuse the matrix into a continuous refractory-containing coating which firmly adheres to the sides of the electrode.

5. A method as in claim 4 wherein said refractory filler is selected from the group consisting of refractory oxides, carbides, nitrides and borides.

6. A method as in claim 4 wherein the matrix material is selected from the group consisting of boric oxide, boric acid, metaboric acid, salts of boric acid and metaboric acid, vanadium pentoxide and mixtures thereof.

7. A method as in claim 4 wherein the matrix is also glaze-forming.

8. A method as in claim 7 wherein the matrix is selected from the group consisting of phosphates, fluorides, silicates and mixtures thereof.

9. A method as in claim 4 wherein the matrix is mixture of graphite-wetting materials selected from the group consisting of boric acid, boric oxide, metaboric acid, salts of boric acid and metaboric acid, vanadium pentoxide and mixtures thereof, and graphite-wetting materials which are also glaze-forming materials selected from the group consisting of phosphates, fluorides, silicates and mixtures thereof.

* * * * *